United States Patent
Belew et al.

(10) Patent No.: US 6,351,126 B1
(45) Date of Patent: Feb. 26, 2002

(54) METHOD AND APPARATUS FOR LOCATING HIGH RESISTANCE UTILITY CONVENYANCES

(75) Inventors: Michael Shane Belew, Columbus, OH (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/571,623

(22) Filed: May 15, 2000

(51) Int. Cl.[7] .......................... G01R 19/00; G01V 3/08; G01V 3/11
(52) U.S. Cl. ........................................ 324/326; 324/67
(58) Field of Search ........................ 324/326, 67, 228, 324/232, 327, 329, 539, 541, 543, 544

(56) References Cited

U.S. PATENT DOCUMENTS

| | | | | |
|---|---|---|---|---|
| 4,118,662 A | * | 10/1978 | Weber | 324/326 |
| 4,143,251 A | * | 3/1979 | Clark | 324/67 |
| 4,896,117 A | * | 1/1990 | Flowerdew et al. | 324/520 |
| 5,541,516 A | * | 7/1996 | Rider et al. | 324/326 |
| 5,644,237 A | | 7/1997 | Eslambolchi et al. | 324/326 |
| 5,767,678 A | * | 6/1998 | Mercer | 324/326 |
| 6,100,699 A | * | 8/2000 | Eslambolchi et al. | 324/529 |

* cited by examiner

*Primary Examiner*—Jay Patidar
*Assistant Examiner*—Reena Aurora
(74) *Attorney, Agent, or Firm*—Robert B. Levy

(57) ABSTRACT

Location of an underground utility conveyance having a metallic part (10) running along its length is enhanced by providing a plurality of selective conduction units (30) spaced along the length of the conveyance. Each selective conduction unit selectively shunts the metallic part of the conveyance to ground at a point between its first and second ends in response to a particular pattern of pulses modulated onto the locating tone impressed on the metallic part by a cable-locating signal generator (14) to cause only that portion of the metallic part lying between the first end and said point to radiate the locating signal. In this way, the amplitude of the locating signal radiated above the earth for locating purposes is increased.

17 Claims, 1 Drawing Sheet

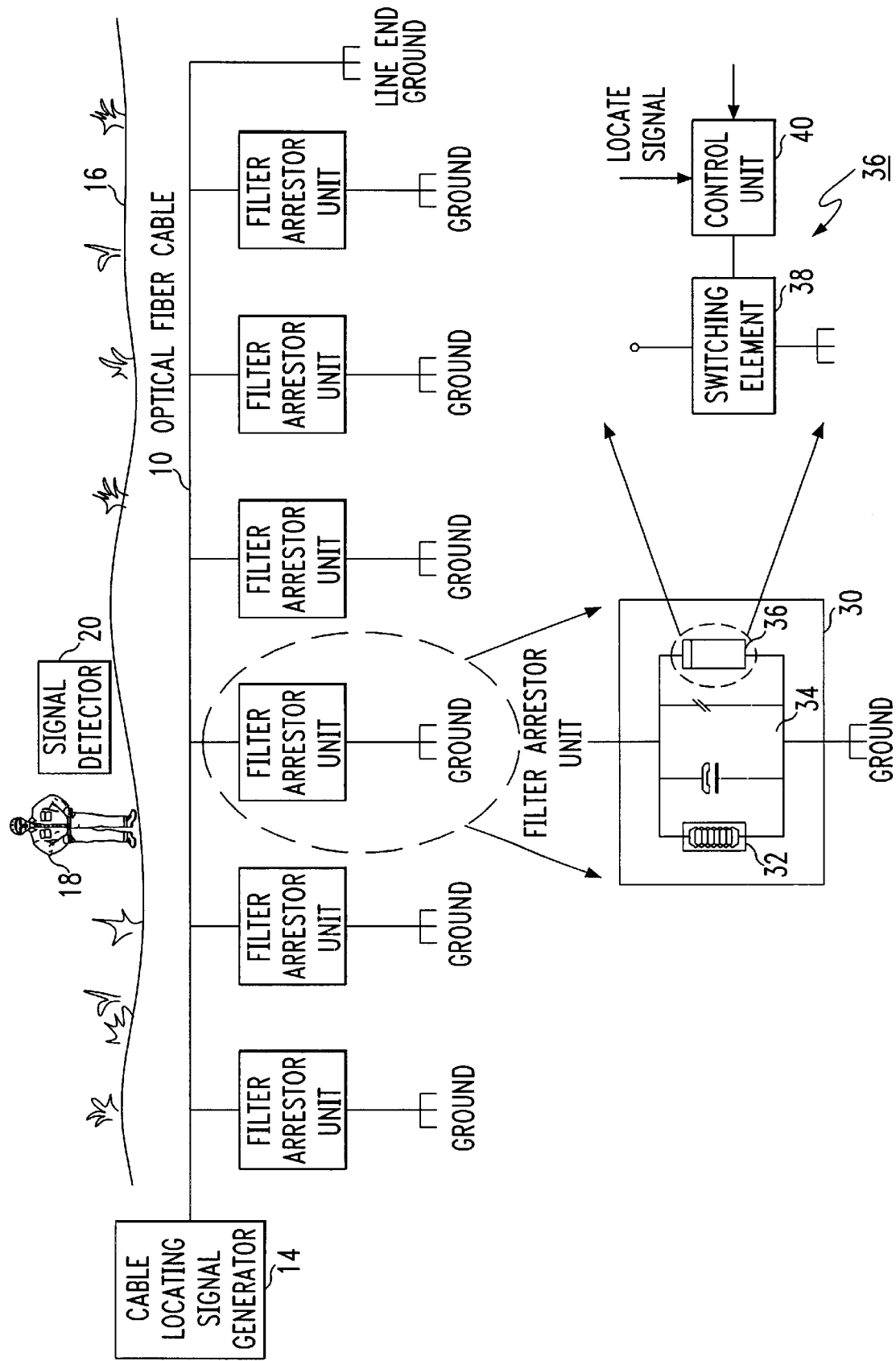

METHOD AND APPARATUS FOR LOCATING HIGH RESISTANCE UTILITY CONVENYANCES

TECHNICAL FIELD

This invention relates to a technique for locating a high-resistance underground utility conveyance via electromagnetic signaling.

BACKGROUND ART

Many utilities, such as AT&T, bury their pipes and cables ("utility conveyances") underground both for reasons of safety and esthetics. Underground burial often provides protection to utility conveyances against weather and other sources of potential damage. Utilities that undertake burial of their conveyances usually make extensive efforts to plot the location of each buried conveyance on a map to facilitate its location in case of repair or replacement. While a map will indicate the general location of a buried conveyance, more precise location information often becomes necessary, particularly in urban environments. For that reason, most utilities that bury their conveyances underground typically rely on electromagnetic signaling techniques to precisely locate such conveyances.

U.S. Pat. No. 5,644,237, issued in the names of Hossein Eslambolchi and John Huffman, on Jul. 1, 1997, and assigned to AT&T, (incorporated by reference herein) discusses the principle of electromagnetic signaling for locating a buried utility conveyance. To locate a buried conveyance, a locating tone (signal) is applied to a metallic part of the conveyance. In the case of an optical fiber cable, the metallic part comprises either a metallic sheath or a copper trace wire within the cable. Using a signal detector of a type well known in the art, a technician detects the locating tone radiated above ground to precisely locate the conveyance.

Generally, the greater the amplitude of the locating tone applied to the metallic part of the conveyance, the greater the amplitude of the locating signal radiated above ground and hence, the more likely that a technician can detect the signal. The resistance of the metallic part of the conveyance typically limits the amplitude of the locating tone that can be applied. Optical fiber cables that employ a copper tracing wire can carry a higher amplitude locating tone as compared to optical fiber cables employing a high-resistance carbon-steel metallic sheath. Consequently, locating buried utility conveyances that have a high resistance metallic part has proven problematic by virtue of the reduced amplitude of the locating tone radiated above the ground.

Thus, there is a need for a technique for overcoming the aforementioned disadvantages associated with locating such high-resistance underground utility conveyances.

BRIEF SUMMARY OF THE INVENTION

Briefly, the present invention provides a method for locating an underground utility conveyance having a metallic part that runs along its length. In accordance with the method, a locating tone is applied to a first end of the metallic part of the conveyance while the second end of the metallic part is coupled to ground. The metallic part of the conveyance is selectively shunted to ground at a point lying between the first and second ends, thus causing only that portion of the metallic part lying between the point selectively grounded and the first end to radiate a locating signal. Selectively shunting the metallic part of the conveyance to ground at a point between the two ends serves to reduce the effective length, and hence the resistance of the metallic part, thereby increasing the strength of the locating signal radiated above ground, making detection of the locating signal, and location of the conveyance more reliable.

BRIEF DESCRIPTION OF THE DRAWINGS

FIG. 1 depicts a block diagram of a system for locating a high-resistance underground utility conveyance in accordance with the invention.

DETAILED DESCRIPTION

FIG. 1 depicts a buried utility conveyance typically in the form of an optical fiber cable having a metallic part 10 that runs along the length of the cable. The metallic party 10 may comprise a copper tracer wire, or a carbon steel sheath, having a first end connected to a cable-locating signal generator 14 while the second end of the metallic part is coupled to ground. The cable locating signal generator 14 applies a locating tone (signal) to the metallic part 10, causing the metallic part to radiate the locating signal above the ground 16 for detection by a technician 18 using a signal detector 20 known in the art for this purpose.

Locating a buried conveyance in the manner discussed above works well when the metallic part 10 of the conveyance has a low resistance so that the locating signal radiated above the ground has a large amplitude. However, if the metallic part 10 has a relatively high resistance, such as the case of a carbon-steel sheath in certain optical fiber cables, then the amplitude of the locating tone that can be applied is limited, thus limiting the amplitude of the radiated locating signal, thereby making detection of the signal, and location of the conveyance more difficult.

In practice, buried utility conveyances typically have a plurality of filter arrestor units 30—30 spaced along the metallic part 10, with each filter arrestor coupled between the metallic part and circuit ground, for the purpose of shunting both 60 HZ signals and high voltages to ground. To that end, each filter arrestor unit 30 comprises a 60 Hz filter trap 32 coupled between the metallic part 10 and circuit ground for shunting 60 Hz signals to ground. The parallel combination of a gas tube and Metal Oxide Varistor 34 shunts the 60 Hz filter trap 32 for the purpose of conducting high voltage, such as from a lightning strike or the like, to ground.

In accordance with the invention, each filter arrestor 30 includes a selective conduction unit 36 for selectively shunting the metallic party 10 of the conveyance to ground, thereby selectively decreasing the effective length of the metallic part. Selectively decreasing the effective length of the metallic part 10 serves to effectively decrease its resistance, and thus increase the amplitude of the locating signal radiated by the metallic part above the earth 16. The selective conduction unit 36 is coupled in parallel with the parallel combination of the gas tube and Metal Oxide Varistor 34 and the 60 Hz filter trap 32. The selective conduction unit 36 includes a switching element 38 in the form of a solid state relay, or a semiconductor (e.g., a switching transistor or silicon controlled rectifier) whose switching portion shunts the parallel combination of the gas tube and Metal Oxide Varistor 34 and the 60 Hz filter trap 32.

A control unit 40 controls the switching state of the switch element 38 in accordance with the locating signal applied to the metallic part 10. In accordance with the invention, the cable locating signal generator 14 possesses the capability to modulate different pulse patterns onto the locating tone applied to the metallic part 10. The control unit 40 within each separate selective conduction unit 30 responds to a particular pulse pattern unique to that control unit. The technician 18, when seeking to locate the conveyance, signals the cable-locating signal generator 14 to generate a particular pulse pattern associated with a particular selective conduction unit 30 that lies along the metallic part 10 within the given region where the technician 18 seeks to locate the conveyance. The technician may automatically signal the cable-locating signal generator 14 directly via a telephone link to that device itself, or a related control device or via a command an operator at the location of the signal generator effect the desired pulse pattern. By signaling the cable-locating signal generator 14 to trigger the particular selective conduction unit 30 to cause its switching element 38 to become conductive and shunt the metallic part 10 to ground, the technician 18 will trigger an increase in the strength of the locating signal within the given region. In this way, the technician 18 can facilitate precise location of the buried conveyance. Until triggered, switching element 38 within the selective conduction unit 30 remains open.

In practice, the control unit 40 within each selective conduction unit 36 may comprise a microprocessor, programmable logic array, field programmable gate array, hard-wired logic circuit or the like which, in response to a particular pulse pattern, generates an output signal capable of triggering the switching element 38. Typically, the locating tone generated by the cable-locating signal generator 14 has a frequency range of 10 Hz to 10 kHz at 150 volts, 1 ampere and provides sufficient electrical power to excite the control unit 40, and to power the switching element 38. Using the locate tone to generated by the cable-locating signal generator 14 to power the both the control unit 40 and the switching element 38 obviates the need for an independent source of power within each selective conduction unit 36.

The foregoing discloses a technique for selectively decreasing the effective length of the metallic part of a buried utility conveyance to effectively decrease its resistance, and thereby increase the amplitude of the locating signal radiated above the earth for locating purposes.

The above-described embodiments merely illustrate the principles of the invention. Those skilled in the art may make various modifications and changes that will embody the principles of the invention and fall within the spirit and scope thereof.

What is claimed is:

1. A method for locating a buried underground conveyance having a high resistance metallic part that runs along its length, comprising the steps of:
    applying a locating signal to a first end of the metallic part of the conveyance while coupling a second end of the metallic part to ground;
    selectively shunting the metallic part of the conveyance to ground at a point between said first and second ends, such that said point lies at least as far from the first end from where location of the conveyance is desired, to cause only that portion of metallic part lying between the first end and said point to radiate the locating signal;
    detecting the locating signal radiated by said only portion of the metallic part to locate the conveyance.

2. The method according to claim 1 wherein the locating signal is modulated with a pulse pattern to control the location of the point at which the metallic part is shunted to ground.

3. The method according to claim 1 wherein the metallic part is shunted within a region that encompasses an area where location of the conveyance is sought.

4. The apparatus according to claim 1 wherein the cable-locating signal generator produces a locating tone within the frequency range of 10 Hz to 10 kHz.

5. Apparatus for locating a buried underground conveyance having a high resistance metallic part that runs along its length, comprising:
    a conveyance-locating signal generator for applying a locating signal to a first end of the metallic part of the conveyance whose second end is coupled to ground;
    a plurality of selective conduction units spaced along the metallic part, each selective conduction unit selectively shunting the metallic part of the conveyance to ground at a point between said first and second ends in response to a particular pattern of pulses modulated onto the locating signal by the conveyance-locating signal generator to cause only that portion of the metallic part lying between the first end and said point to radiate the locating signal; and
    a signal detector for detecting the locating signal radiated by said only portion of the metallic part to locate the conveyance.

6. The apparatus according to claim 5 wherein each selective conduction unit comprises:
    a switching element having its switching portion coupled between the metallic part and circuit ground; and
    a control unit for controlling said switching element in response to the pattern of pulses modulated onto the locating signal.

7. The apparatus according to claim 6 wherein the switching element comprises a semiconductor.

8. The apparatus according to claim 6 wherein the switching element comprises a solid state relay.

9. The apparatus according to claim 6 wherein the control unit of the selective conduction device is powered from the locating signal impressed on the metallic part.

10. The apparatus according to claim 6 wherein the selective conduction unit further includes:
    a 60 Hz filter trap coupled in parallel with the switching element for shunting 60 Hz. signals to ground; and
    a parallel combination of a gas tube and Metal Oxide Varistor shunting the 60 HZ filter trap for conducting high voltages to ground.

11. Apparatus for causing a buried underground conveyance having a high resistance metallic part that runs along its length to radiate a locating signal to facilitate locating the conveyance, comprising:
    a conveyance-locating signal generator for applying a locating signal to a first end of the metallic part of the conveyance whose second end is coupled to ground; and
    a plurality of selective conduction units spaced along the metallic part, each selective conduction unit selectively shunting the metallic part of the conveyance to ground at a point between said first and second ends in response to a particular pattern of pulses modulated onto the locating signal by the conveyance-locating signal generator to cause only that portion of the metallic part lying between the first end and said point to radiate the locating signal.

12. The apparatus according to claim 11 wherein each selective conduction unit comprises:

a switching element having its switching portion coupled between the metallic part and circuit ground; and a control unit for controlling said switching element in response to the pattern of pulses modulated onto the locating tone.

13. The apparatus according to claim 12 wherein the switching element comprises a semiconductor.

14. The apparatus according to claim 12 wherein the switching element comprises a solid state relay.

15. The apparatus according to claim 12 wherein the control unit of the selective conduction device is powered from the locating signal impressed on the metallic part.

16. The apparatus according to claim 12 wherein the selective conduction unit further includes:

a 60 Hz filter trap coupled in parallel with the switching element for shunting 60 Hz. signals to ground; and a parallel combination of a gas tube and Metal Oxide Varistor shunting the 60 HZ filter trap for conducting high voltages to ground.

17. The apparatus according to claim 11 wherein the cable-locating signal generator produces a locating tone within the frequency range of 10 Hz to 10 kHz.

* * * * *

UNITED STATES PATENT AND TRADEMARK OFFICE
CERTIFICATE OF CORRECTION

PATENT NO. : 6,351,126 B1
DATED : February 26, 2002
INVENTOR(S) : Michael Shane Belew, Hossein Eslambolchi and John Sinclair Huffman It is certified that error appears in the above-identified patent and that said Letters Patent is hereby corrected as shown below:

<u>Title page, Item [54] and Column 1, line 3,</u>
Change "CONVENYANCES" to -- CONVEYANCES --.

Signed and Sealed this

Twenty-third Day of July, 2002

Attest:

Attesting Officer

JAMES E. ROGAN
*Director of the United States Patent and Trademark Office*